(12) United States Patent
Badger et al.

(10) Patent No.: US 10,377,243 B2
(45) Date of Patent: *Aug. 13, 2019

(54) ELECTRIFIED VEHICLE ENERGY DISSIPATION

(71) Applicant: FORD GLOBAL TECHNOLOGIES, LLC, Dearborn, MI (US)

(72) Inventors: Justin Reuel Badger, Plymouth, MI (US); Christopher Michael Kava, Taylor, MI (US); Mark Anthony Rockwell, Wyandotte, MI (US); Donald Mitchem, Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

This patent is subject to a terminal disclaimer.

(21) Appl. No.: 15/416,627

(22) Filed: Jan. 26, 2017

(65) Prior Publication Data

US 2017/0144550 A1    May 25, 2017

Related U.S. Application Data

(63) Continuation of application No. 14/664,968, filed on Mar. 23, 2015, now Pat. No. 9,586,485.

(51) Int. Cl.
*B60L 7/18* (2006.01)
*B60L 1/00* (2006.01)
(Continued)

(52) U.S. Cl.
CPC ............ *B60L 7/18* (2013.01); *B60K 6/445* (2013.01); *B60K 31/02* (2013.01); *B60L 1/003* (2013.01); *B60L 1/02* (2013.01); *B60L 1/12* (2013.01); *B60W 10/08* (2013.01); *B60W 10/184* (2013.01); *B60W 10/30* (2013.01);
(Continued)

(58) Field of Classification Search
CPC .... B60L 7/18; B60L 11/1861; B60L 11/1874; B60L 1/00; B60L 1/003; B60L 3/0023; B60L 3/0046; B60L 3/08; B60L 7/10; B60L 7/22; B60L 11/1809; B60L 11/1851; B60L 2240/54–2240/549; B60L 1/02; B60W 10/184; B60W 10/30; B60W 20/10; B60W 2510/256; B60W 2510/244; B60W 10/04; B60W 10/12; B60W 10/24–10/26; B60W 20/13–20/15; B60W 30/18127; B60W 30/182; B60W 30/1886; B60W 2510/08; B60W 2510/085; B60W 2510/087;
(Continued)

(56) References Cited

U.S. PATENT DOCUMENTS 4,181,188 A * 1/1980 Dessert .................... B60K 1/00
                                                            180/2.2
5,291,960 A   3/1994 Brandenburg et al.
(Continued)

FOREIGN PATENT DOCUMENTS

EP    2020315       8/2011
GB    1120118       7/1968
WO    2008147305    12/2008

*Primary Examiner* — Bao Long T Nguyen
(74) *Attorney, Agent, or Firm* — Carlson, Gaskey & Olds, P.C.

(57) ABSTRACT

An exemplary electrified vehicle assembly includes a coolant circuit and a controller configured to selectively direct energy into at least one component of the coolant circuit to provide a negative wheel torque.

19 Claims, 3 Drawing Sheets

(51) Int. Cl.

| | |
|---|---|
| *B60L 1/02* | (2006.01) |
| *B60L 1/12* | (2006.01) |
| *B60L 58/12* | (2019.01) |
| *B60L 58/26* | (2019.01) |
| *B60W 10/08* | (2006.01) |
| *B60W 10/184* | (2012.01) |
| *B60W 10/30* | (2006.01) |
| *B60W 20/00* | (2016.01) |
| *B60W 20/14* | (2016.01) |
| *B60W 30/18* | (2012.01) |
| *B60K 31/02* | (2006.01) |
| *B60K 6/445* | (2007.10) |

(52) U.S. Cl.
CPC ............ *B60W 20/00* (2013.01); *B60W 20/14* (2016.01); *B60W 30/18127* (2013.01); *B60L 58/12* (2019.02); *B60L 58/26* (2019.02); *B60W 2510/244* (2013.01); *B60W 2510/246* (2013.01); *Y02T 10/6239* (2013.01); *Y02T 10/705* (2013.01); *Y02T 10/7044* (2013.01); *Y10S 903/907* (2013.01); *Y10S 903/947* (2013.01)

(58) Field of Classification Search
CPC .......... B60W 2510/246; Y10S 903/907; Y10S 903/947; B60K 6/445; B60K 31/02; Y02T 10/6239
USPC ..... 701/22, 36, 48; 180/65.1, 65.21, 65.265, 180/65.275, 65.285, 65.29, 65.31, 65.8, 180/68.1, 68.2; 903/907, 930, 947
See application file for complete search history.

(56) References Cited

U.S. PATENT DOCUMENTS

| | | | |
|---|---|---|---|
| 5,343,970 | A | 9/1994 | Severinsky |
| 5,345,761 | A | 9/1994 | King et al. |
| 5,641,016 | A | 6/1997 | Isaji et al. |
| 7,260,947 | B1 | 8/2007 | Harrison |
| 7,420,339 | B2 | 9/2008 | Chung et al. |
| 8,393,551 | B2 | 3/2013 | Nemesh et al. |
| 8,628,025 | B2 | 1/2014 | Bucknell |
| 8,630,759 | B2 | 1/2014 | Bauerle |
| 8,816,530 | B2 | 8/2014 | Callicoat et al. |
| 8,869,923 | B2 | 10/2014 | Osara et al. |
| 2003/0189380 | A1 | 10/2003 | Ishikawa et al. |
| 2006/0046895 | A1* | 3/2006 | Thacher ................... B60L 7/26 477/4 |
| 2006/0116797 | A1 | 6/2006 | Moran |
| 2007/0103002 | A1 | 5/2007 | Chiao et al. |
| 2007/0124037 | A1 | 5/2007 | Moran |
| 2010/0025135 | A1 | 2/2010 | Reuter et al. |
| 2010/0145562 | A1 | 6/2010 | Moran |
| 2011/0246007 | A1 | 10/2011 | Choi et al. |
| 2011/0264317 | A1* | 10/2011 | Druenert .................. B60K 6/48 701/22 |
| 2013/0268182 | A1 | 10/2013 | Treharne et al. |
| 2014/0244082 | A1 | 8/2014 | Caron |
| 2015/0207344 | A1 | 7/2015 | Wang et al. |
| 2015/0330351 | A1 | 11/2015 | Ragazzi et al. |
| 2015/0360675 | A1 | 12/2015 | Nefcy et al. |
| 2016/0114786 | A1* | 4/2016 | Morisaki ........... B60W 50/0097 701/22 |

\* cited by examiner

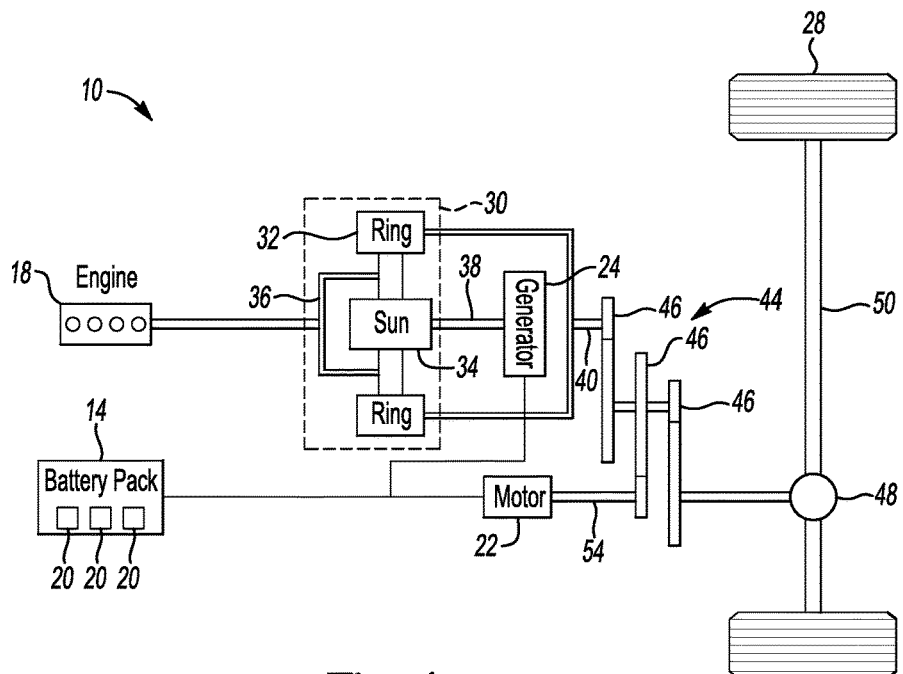
_Fig-1_
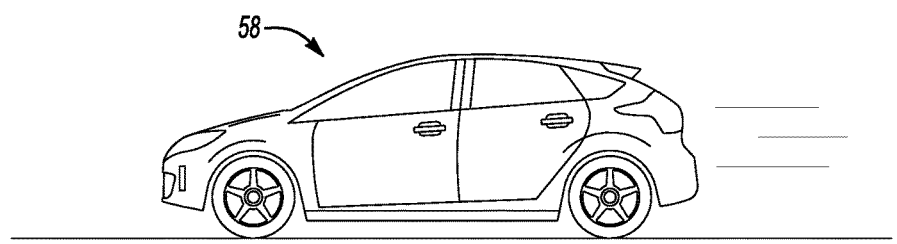
_Fig-2_
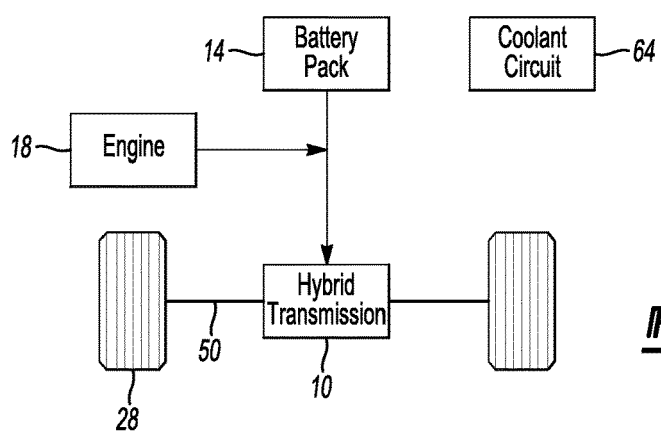
_Fig-3_

ELECTRIFIED VEHICLE ENERGY DISSIPATION

CROSS-REFERENCE TO RELATED APPLICATIONS

This application is a continuation of U.S. application Ser. No. 14/664,968, which was filed on 23 Mar. 2015 and is incorporated herein by reference.

TECHNICAL FIELD

This disclosure relates to dissipating energy and, more particularly, to dissipating energy using to a component of a cooling circuit of an electrified vehicle.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine.

Electric machines can drive electrified vehicles instead of, or in addition to, an internal combustion engine. Example electrified vehicles include all-electric vehicles, hybrid electric vehicles (HEVs), plug-in hybrid electric vehicles (PHEVs), fuel cell vehicles, and battery electric vehicles (BEVs).

Some electrified vehicles use energy recovery mechanisms, such as regenerative braking systems, to recover energy. The recovered energy is stored within a battery until the energy is used to power the electric machines. In some situations, the battery may be unable to store all the recovered energy. For example, the battery may be at full capacity, or the temperature of the battery may be too high.

SUMMARY

An electrified vehicle assembly, according to an exemplary aspect of the present disclosure, includes, among other things, a coolant circuit, and a controller configured to selectively direct energy from an energy recovery mechanism into a component of the coolant circuit.

In a further non-limiting embodiment of the foregoing assembly, the component includes an electric coolant pump.

In a further non-limiting embodiment of any of the foregoing assemblies, the component includes an electric fan.

In a further non-limiting embodiment of any of the foregoing assemblies, the component includes an electric heater.

In a further non-limiting embodiment of any of the foregoing assemblies, the component of the cooling circuit includes an electric coolant pump, an electric fan, and an electric heater.

In a further non-limiting embodiment of any of the foregoing assemblies, the controller is further configured to selectively direct energy from the energy recovery mechanism to a resistor bank.

In a further non-limiting embodiment of any of the foregoing assemblies, the assembly includes a vehicle battery. The controller selectively directs energy from the energy recovery mechanism to a resistor bank in response to an energy level of a battery of the electrified vehicle.

In a further non-limiting embodiment of any of the foregoing assemblies, the assembly includes a vehicle battery. The controller selectively directs energy from the energy recovery mechanism to a resistor bank in response to a temperature.

In a further non-limiting embodiment of any of the foregoing assemblies, the electrified vehicle assembly is within a hybrid electric vehicle.

In a further non-limiting embodiment of any of the foregoing assemblies, the energy recovery device is a regenerative braking system that resists rotation of a wheel of the electrified vehicle.

A method of dissipating energy within an electrified vehicle, according to an exemplary aspect of the present disclosure, includes, among other things, generating an amount of energy from an energy recovery device, and directing the amount of energy to a component of a coolant circuit of an electrified vehicle.

In a further non-limiting embodiment of the foregoing method, the component includes an electric coolant pump.

In a further non-limiting embodiment of any of the foregoing methods, the component includes an electric fan.

In a further non-limiting embodiment of any of the foregoing methods, the component includes an electric heater.

In a further non-limiting embodiment of any of the foregoing methods, the component of the cooling circuit includes an electric coolant pump, an electric fan, and an electric heater.

In a further non-limiting embodiment of any of the foregoing methods, the amount of energy is a first amount of energy. The method further includes generating a second amount of energy using the energy recovery device and directing the second amount of energy to a resistor bank.

In a further non-limiting embodiment of any of the foregoing methods, the method includes powering the at least one component of the coolant circuit in response to an energy level of a battery of the electrified vehicle.

In a further non-limiting embodiment of any of the foregoing methods, the method includes powering in response to a temperature of a battery of the electrified vehicle.

In a further non-limiting embodiment of any of the foregoing methods, the method further comprises using the energy recovery device to resist rotation of at least one wheel to maintain a speed of the electrified vehicle when the electrified vehicle is descending a grade.

In a further non-limiting embodiment of any of the foregoing methods, the energy recovery device comprises a regenerative braking system.

DESCRIPTION OF THE FIGURES

The various features and advantages of the disclosed examples will become apparent to those skilled in the art from the detailed description. The figures that accompany the detailed description can be briefly described as follows:

FIG. 1 shows a schematic view of an example hybrid transmission for an electrified vehicle.

FIG. 2 shows the electrified vehicle having the hybrid transmission of FIG. 1 and traveling on level ground.

FIG. 3 shows a schematic view of an example energy distribution when the electrified vehicle is in the position of FIG. 2.

DETAILED DESCRIPTION

Figure 4:
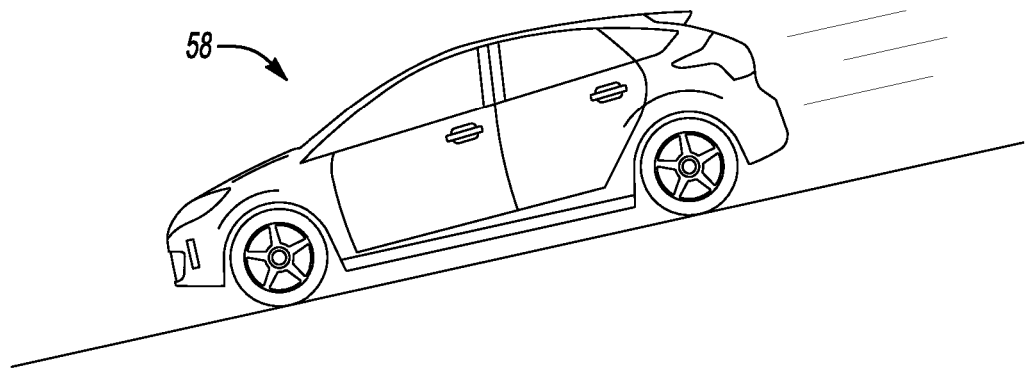
FIG. 4 shows the electrified vehicle having the hybrid transmission of FIG. 1 and descending a grade.

This disclosure relates generally to dissipating energy within an electrified vehicle. The energy that is dissipated is generated by an energy recovery mechanism, such as a regenerative braking system. More particularly, the disclosure relates to dissipating energy using a cooling circuit when a battery of the electrified vehicle cannot take on additional energy.

FIG. 1 schematically illustrates a hybrid transmission 10 for a hybrid electric vehicle (HEV). A battery pack 14 and an internal combustion engine 18 selectively operate with the hybrid transmission 10. The battery pack 14 includes arrays 20 of rechargeable battery cells.

The hybrid transmission 10 includes a motor 22 and a generator 24, which are both types of electric machines. The motor 22 and generator 24 may be separate or may have the form of a combined motor-generator.

In this embodiment, the hybrid transmission 10 is a power-split transmission that employs a first drive system and a second drive system. The first and second drive systems generate torque to drive one or more sets of vehicle drive wheels 28. The first drive system includes a combination of the engine 18 and the generator 24. The second drive system includes at least the motor 22, the generator 24, and the battery pack 14. The motor 22 and the generator 24 are portions of an electric drive system of the hybrid transmission 10.

The engine 18 and the generator 24 may be connected through a power transfer unit 30, such as a planetary gear set. Of course, other types of power transfer units, including other gear sets and transmissions, can be used to connect the engine 18 to the generator 24. In one non-limiting embodiment, the power transfer unit 30 is a planetary gear set that includes a ring gear 32, a sun gear 34, and a carrier assembly 36.

The generator 24 can be driven by the engine 18 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 18 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

The regenerative braking system is a type of energy recovery mechanism. The regenerative braking system that can be used to reduce the speed of the vehicle. Under some driving conditions, such as when the vehicle is descending a grade for an extended period, the cells within the arrays 20 of the battery pack 14 may be unable to store all the energy from the regenerative braking system.

Under these driving conditions, friction brakes could be used to slow the vehicle in place of, or in addition to, the regenerative braking system. Friction brakes, however, generate thermal energy and using the friction brakes causes wear.

Under these driving conditions, the engine 18 could be used for compression braking. This approach increases wear on the engine 18, increases fuel consumption, and requires a high engine speed, which can be relatively loud.

The example vehicle accommodates energy from the regenerative braking system that cannot be stored in the cells. This approach increases the usability of the regenerative braking systems and reduces the need to use friction brakes or the engine 18 to maintain or decrease a vehicle speed.

Examples conditions that require energy dissipation, rather than generation, can include the vehicle having the hybrid transmission 10 moving down a grade in a grade descent assist mode, the vehicle requiring speed control moving down a grade, the vehicle operating in a low gear when descending a grade, or the vehicle maximizing its speed when descending a grade.

Referring now to FIGS. 2 to 5 with continuing reference to FIG. 1, a vehicle 58 includes the hybrid transmission 10. When the vehicle 58 is on relatively level ground (FIGS. 2 and 3), the battery pack 14, the engine 18, or both can apply a positive torque to the wheels 28 through the hybrid transmission 10. The positive torque moves the vehicle 58 forward. The positive wheel torque is need to maintain a speed of the vehicle 58.

When the vehicle 58 is descending a grade (FIGS. 4 and 5), the regenerative braking system is used to apply a negative torque to the wheels 28 to maintain a speed or to limit acceleration of the vehicle 58 down the grade. The negative wheel torque is needed to maintain a speed of the vehicle 58 when descending the grade. The regenerative braking system generates energy E through the hybrid transmission 10.

The battery pack 14 typically stores the energy. However, as described above in connection with FIG. 1, under some conditions the battery pack 14 may be unable to store all of the power from the regenerative braking. The example vehicle 58 dissipates the power that cannot be accommodated by the battery pack 14 rather than relying on friction brakes to maintain a speed or to limit acceleration of the vehicle 58. This permits the regenerative braking to be used even if the battery pack 14 cannot store the energy from the regenerative braking. Using the regenerative braking rather than friction brakes reduces wear and reduces thermal energy build-up.

Figure 6:
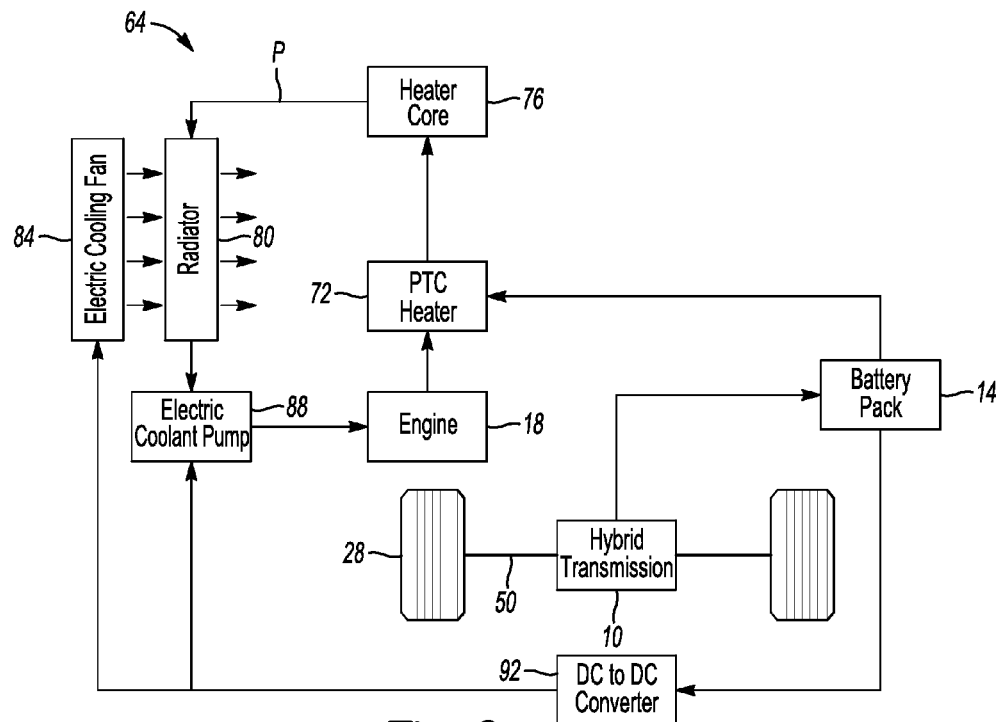
FIG. 6 is a highly schematic view of energy dissipation using at least one component of a coolant circuit when the electrified vehicle is in the position of FIG. 4.

Referring now to FIG. 6, the vehicle 58 includes a coolant circuit 64. Components of the coolant circuit 64 include, in this example, a heater 72, a heater core 76, a radiator 80, an electric cooling fan 84, an electric cooling pump 88 and the engine 18. In the vehicle 58, the heater 72, which can be a positive temperature coefficient (PTC) heater, using relatively high voltage DC to put heat into the cooling circuit 64 so that a passenger compartment of the vehicle 58 can be heated while keeping the engine 18 off.

Within the coolant circuit 64, coolant moves along path P from the heater 72 and the heater core 76 to the radiator 80. The heater 72 uses the high voltage DC to heat the coolant. The heater core 76 is, in this example, a water to air heat exchanger that allows heat to be transferred from the coolant circuit 64 to the passenger compartment of the vehicle 58. The radiator 80 transfers remaining, or excess, heat to ambient air.

The cooling fan 84 moves a flow of air across the radiator 80 to remove thermal energy from the coolant within the radiator 80 when required. The cooling fan 84 is powered with 12V power in this example.

The coolant, which has been relatively cooled, then moves from the radiator 80 to the electric coolant pump 88, and then to the engine 18. The coolant returns to the heater 72 from the engine 18. The electric coolant pump 88, like the cooling fan 84, is powered with 12V power. The electric coolant pump 88 circulates coolant through the coolant circuit 64.

The vehicle 58 selectively dissipates excess energy EE (FIG. 5) from the regenerative braking system, or another type of energy recovery mechanism, into the coolant circuit 64. In this example, the vehicle 58 dissipates the energy into at least one component of the coolant circuit 64.

Figure 5:
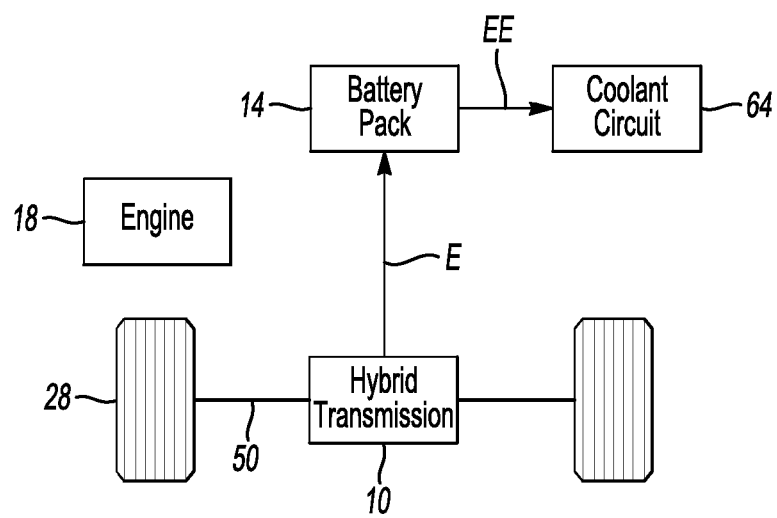
FIG. 5 shows a schematic view of an example energy distribution when the electrified vehicle is in the position of FIG. 4.

For purposes of this disclosure, excess energy EE is considered energy from the energy recovery mechanism that cannot be held within the battery pack 14. The battery pack 14 may be unable to hold energy because the battery pack 14 is at its capacity or is at a high temperature, for example. The excess energy EE in the exemplary embodiment of FIG. 5 is thus shown as being dissipated to at least one component of the coolant circuit in response an energy level of the battery pack 14, or in response to a temperature of the battery pack 14.

In this example, the excess energy is moved through a portion of the battery pack 14 and then dissipated by powering the heater 72, the electric coolant pump 88, and the electric cooling fan 84. The heater 72 is operated to convert high voltage power from the regenerative braking into heat that is put into the coolant circuit 64. The radiator 80 and the electric cooling fan 84 are used to extract the heat from the coolant circuit 64 and to dissipate the heat into the ambient air.

Other examples may power only one of the heater 72, the electric coolant pump 88, or the electric cooling fan 84. Still other examples may power two of the heater 72, the electric coolant pump 88, or the electric cooling fan 84. Other components of the coolant circuit 64 that are not pictured could also, or instead, be used to dissipate the excess power.

In this example, a DC-to-DC converter 92 is used to convert energy from the battery pack 14 for use by the electric coolant pump 88 and the electric cooling fan 84. The DC-to-DC converter steps the high voltage DC down to a 12V level to power 12V accessories in the vehicle 58, the electric coolant pump 88 and the electric cooling fan 84.

To dissipate excess energy, the electric coolant pump 88 and the electric cooling fan 84 can be used to remove heat from the coolant circuit 64. This allows the DC-to-DC converter to consume excess energy.

The vehicle 58 can include a controller that is programmed to have a smart energy dissipation mode. When the vehicle 58 activates the smart energy dissipation mode, excess energy is dissipated into the coolant circuit 64. When the smart energy dissipation mode is not activated, energy from the regenerative braking system is stored in the cells of the arrays 20 within the battery pack 14.

The vehicle 58 can activate the smart energy dissipation mode in response to the energy recovery mechanism generating excess energy. The ability of the battery pack 14 to accommodate energy may be limited based on the capacity. The battery pack 14 may be at full capacity, for example.

The vehicle 58 can activate the smart energy dissipation mode in response to the vehicle 58 descending a particularly steep grade, say greater than 4 degrees, or for descending another grade for a set period of time.

Figure 7:
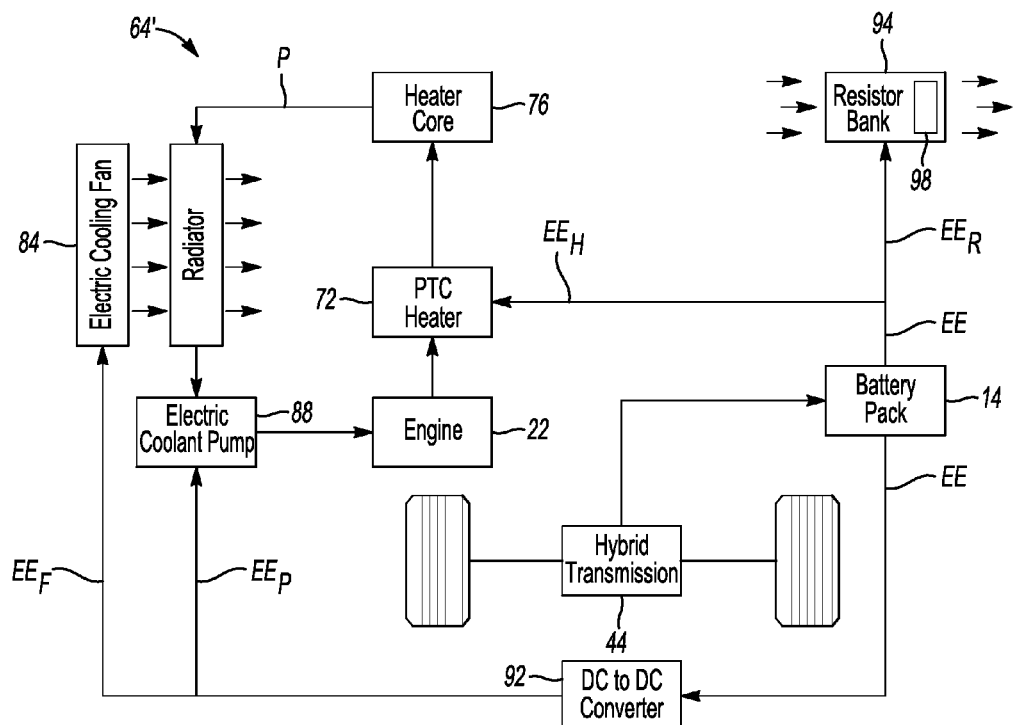
FIG. 7 is a highly schematic view of energy dissipation using at least one component of a coolant circuit and a resistor bank when the electrified vehicle is in the position of FIG. 4.

Referring now to FIG. 7, another example coolant circuit 64' is used in connection with a resistor bank 94. The remaining portions of the coolant circuit 64' are similar to the components of the coolant circuit 64.

Like the coolant circuit 64 of FIG. 6, the coolant circuit 64' dissipates the excess energy EE by powering the heater 72 with excess energy $EE_H$, the electric cooling fan 84 with excess energy $EE_F$, the electric coolant pump 88 with excess energy $EE_P$, or some combination of these.

In this example, the vehicle 58 has a vehicle weight of approximately 4000 pounds. This vehicle 58, when descending an extended grade that averages about 5 percent decline requires approximately 18 kW of power dissipation to maintain 70 miles per hour down that 5 percent decline.

The heater 72 of the example vehicle 58 can dissipate approximately 5 kW of power. The electric coolant pump 88, the electric cooling fan, etc. can dissipate approximately 1 kW. The components of the coolant circuit 64' would thus not dissipate enough power to maintain a speed of the vehicle 58. In the coolant circuit 64', excess energy is thus also be dissipated into the resistor bank 94.

The resistor bank 94 includes one or more arrays of resistors 98 that absorb excess energy $EE_R$. Airflow may be used to cool the arrays of resistors 98 within the resistor bank 94. The airflow could be ram airflow or could be airflow from the electric cooling fan 84 or some other cooling fan.

The above examples of the smart power dissipation mode could be used in cooperation with either engine compression braking, foundation brakes, or both. This would allow for the friction brakes to be used and not at such a risk for overheating or degrading the lifetime. When used in conjunction of with engine compression braking, the smart power dissipation mode could allow for the engine 18 to operate at a much lower engine speed than without the mode.

On relatively moderate grades, such as those close to 2 to 3 percent decline, the vehicle 58 in this example, could, in many cases, maintain its speed using only the smart power dissipation mode operation and existing hardware, and without requiring supplemental braking with engine compression braking, friction brakes, etc.

The example vehicle 58 is a hybrid-electric vehicle having a hybrid transmission. The disclosed techniques are particularly applicable to hybrids due to the relatively small capacity of the traction battery.

In other examples, the vehicle could be an all-electric vehicle incorporating a regenerative braking system. In still other examples, the vehicle could be a vehicle incorporating an energy recovery device other than a regenerative braking system.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An electrified vehicle assembly, comprising:
a coolant circuit; and
a controller configured to direct energy from an energy recovery mechanism into at least one component of the coolant circuit when an energy dissipation mode is activated, and configured to direct energy from the energy recovery mechanism into a battery of an electrified vehicle when the energy dissipation mode is not activated, the energy dissipation mode activated in response to a grade.

2. The electrified vehicle assembly of claim 1, wherein the at least one component comprises an electric coolant pump.

3. The electrified vehicle assembly of claim 1, wherein the at least one component comprises an electric fan.

4. The electrified vehicle assembly of claim 1, wherein the at least one component comprises an electric heater.

5. The electrified vehicle assembly of claim 1, wherein the at least one component of the cooling circuit comprises each of an electric coolant pump, an electric fan, and an electric heater.

6. The electrified vehicle assembly of claim 1, further comprising a vehicle battery, the controller selectively direct energy into the at least one component of the coolant circuit in response to an energy level of the vehicle battery.

7. The electrified vehicle assembly of claim 1, further comprising a vehicle battery, the controller selectively direct energy into the at least one component of the coolant circuit in response to a temperature of the vehicle battery.

8. The electrified vehicle assembly of claim 1, wherein the electrified vehicle assembly is within a hybrid electric vehicle.

9. The electrified vehicle assembly of claim 1, wherein the energy recovery device is a regenerative braking system that resists rotation of at least one wheel of the electrified vehicle.

10. The electrified vehicle assembly of claim 1, wherein the energy dissipation mode is activated in response to the grade being greater than a threshold grade.

11. The electrified vehicle assembly of claim 1, wherein the energy dissipation mode is activated in response to descending the grade for a set period of time.

12. A method of dissipating energy within an electrified vehicle, comprising:
directing an amount of energy generated by an energy recovery device to at least one component of a coolant circuit of an electrified vehicle when an energy dissipation mode is activated, and directing the amount of energy to a battery when the energy dissipation mode is not activated, the energy dissipation mode selectively activated in response to a grade.

13. The method of claim 12, wherein the at least one component of the cooling circuit comprises at least one of an electric coolant pump, an electric fan, or an electric heater.

14. The method of claim 12, further comprising powering the at least one component of the coolant circuit in response to an energy level of a battery of the electrified vehicle.

15. The method of claim 12, further comprising powering in response to a temperature of a battery of the electrified vehicle.

16. The method of claim 12, further comprising using the energy recovery device to resist rotation of at least one wheel to maintain a speed of the electrified vehicle when the electrified vehicle is descending a grade.

17. The method of claim 12, wherein the energy recovery device comprises a regenerative braking system.

18. The method of claim 12, wherein the energy dissipation mode is activated in response to the grade being greater than a threshold grade.

19. The method of claim 12, wherein the energy dissipation mode is activated in response to descending the grade for a set period of time.

* * * * *